Oct. 22, 1968  E. H. PHILLIPS ET AL  3,406,564

ULTRASONIC TRANSDUCER SCANNING SYSTEM

Filed Sept. 13, 1965

INVENTOR
EDWARD H. PHILLIPS
RICHARD B. OSGOOD

BY Q. C. Smith

ATTORNEY

United States Patent Office 3,406,564
Patented Oct. 22, 1968

3,406,564
ULTRASONIC TRANSDUCER SCANNING SYSTEM
Edward H. Phillips and Richard B. Osgood, Los Altos, Calif., assignors to Hewlett-Packard Company, Palo Alto, Calif., a corporation of California
Filed Sept. 13, 1965, Ser. No. 486,969
12 Claims. (Cl. 73—67.8)

ABSTRACT OF THE DISCLOSURE

An oscillatory mass including an ultrasonic transducer is supported on a chassis mounted for movement along an arcuate scanning path. A torsion spring coupled at one end to the chassis and at the other end to the oscillatory mass provides the oscillatory mass with a natural frequency of oscillation. The energy lost by the oscillatory mass during oscillation is supplied by a stepping motor. A resolver continuously indicates the position of the transducer during oscillation of the oscillatory mass. An electrical pulse source energizes the transducer to send ultrasonic energy to a body being scanned. The ultrasonic energy reflected back from this body is received by the transducer and applied to a utilization circuit for relation to the time domain.

---

This invention relates to an ultrasonic transducer scanning apparatus for scanning a body under test in a mechanically oscillating mode.

It is the principal object of this invention to provide a scanning system wherein a transducer sends and receives ultrasonic energy in a mechanically oscillating mode.

In accordance with the illustrated embodiment of this invention there is provided a scanning system wherein a torsion spring and a rotating mass, including a transducer for sending and receiving ultrasonic energy are mechanically coupled to provide a resonant system. This resonant system is driven by a stepping motor to oscillate the transducer as the scanning system moves along a selected scanning path. The electrical stepping motor supplies the energy dissipated by the rotating mass and other moving elements of the scanning system, and a resolver continuously provides accurate positioning information during the oscillations of the transducer.

Figure 1:
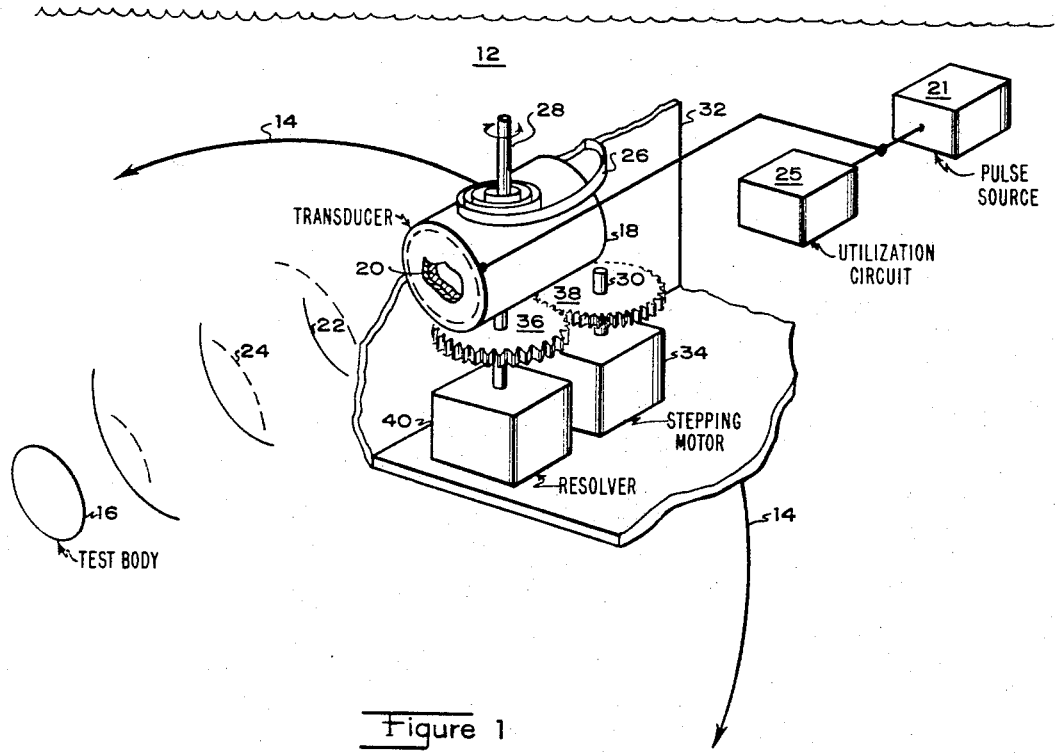
Figure 2:
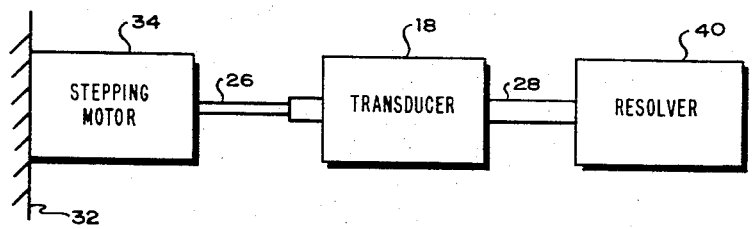

Other and incidental objects of this invention will become apparent from a reading of this specification and an inspection of the accompanying drawing in which:

FIGURE 1 is a schematic view of a scanning system according to the preferred embodiment of this invention; and FIGURE 2 is a schematic view of another embodiment of this invention.

Referring to FIGURE 1, there is shown a scanning system for sending and receiving ultrasonic energy in a mechanically oscillating mode as the system is moved, for example, in an aqueous medium 12 along an arcuate path 14 to scan a body 16 under test. The body 16 under test may either be emersed in the aqueous medium 12 as shown in FIGURE 1 or separated from it by a thin membrane. This scanning system comprises a transducer 18 having a piezoelectric crystal 20 which deforms momentarily, when pulsed by an input signal from pulse source 21, to generate a high pressure acoustical wave 22 which is transmitted through the aqueous medium 12 to the body 16. An acoustical wave 24, which is reflected from the body 16 because of an acoustical impedance mismatch between the body 16 and the aqueous medium 12, momentarily deforms the piezoelectric crystal 20 as it is received thereby. This deformation of the piezoelectric crystal 20 by the reflected acoustical wave 24 causes the piezoelectric crystal to generate a corresponding electrical signal which is applied to a utilization circuit 25 where it is related to the time domain to convey desired information about the structure of the body 16. The information that may be obtained about the structure of the body 16 is maximized since the transducer 18 oscillates as the scanning system moves along the arcuate path 14 so that the piezoelectric crystal 20 generates high pressure acoustical waves over a wide range of angles with respect to the body 16. Thus, the piezoelectric crystal 20 receives reflected waves from skew surfaces and, hence, information that would otherwise be lost.

The oscillating mode of operation of the transducer 18 is provided by mechanically coupling a torsional clock spring 26 to a rotating mass including the transducer 18 and all other elements of the scanning system which are rigidly coupled to the shafts 28 and 30 for rotation therewith. The clock spring 26 is supported on the shaft 28 with one end being attached to shaft 28 and the other end being attached to the chassis 32 on which the rotating mass is mounted. The natural resonant frequency $f_r$ of the clock spring 26 and the rotating mass is approximately equal to $\frac{1}{2}\pi\sqrt{K/I}$, where K is the torsional spring constant of the clock spring 26 and I is the moment of inertia of the rotating mass. Less power is required to oscillate the transducer 18 when it is driven in an oscillating mode at or near this natural resonant frequency $f_r$. A stepping motor 34 is mechanically coupled to the shaft 28 by gears 36 and 38 which are mounted on shafts 28 and 30, respectively, to engage one another with a one to one gear ratio. This stepping motor 34 is driven to supply the energy dissipated by the rotating mass as it oscillates in the aqueous medium 12 and by the friction forces exerted on the other moving elements of the scanning system. Although the stepping motor 34 is normally driven by an input sine-wave signal having a frequency of oscillation approximately equal to the resonant frequency $f_r$, the amplitude and frequency of oscillation of the input sine-wave signal may be varied to alter the amplitude and frequency of oscillation of the rotating mass. A resolver 40 is also mechanically coupled to the shaft 28 to continuously provide an accurate indication of the position of the transducer 18 during each moment of the mechanical oscillation thereof.

Referring now to FIGURE 2, there is shown another way for providing the oscillating mode of operation of the transducer 18. One end of a bar torsion spring 26 is attached to the rotating mass including the shaft 28 and the transducer 18. The other end of the bar torsion spring 26 is attached to be driven by the stepping motor 34 which is mounted on the chassis 32. Resolver 40 is coupled to the shaft 28 for continuously indicating the position of transducer 18 during the mechanical oscillation thereof.

We claim:

1. In an ultrasonic transducer scanning apparatus adapted for movement in a fluid along a selected path to scan a body under test for determining a selected characteristic thereof:

an oscillatory mass being supported by a chassis therefor and including a transducer for sending ultrasonic energy to said body and receiving back reflections therefrom;

a signal source connected for energizing said transducer and causing it to send said ultrasonic energy;

a utilization circuit responsive to the reflections from said body received by said transducer to relate said reflections to the time domain;

a torsion spring having one end coupled to said chassis and the other end coupled to said oscillatory mass to provide said oscillatory mass with a natural frequency of oscillation;

means coupled to said oscillatory mass for supplying the energy lost by the oscillatory mass during mechanical oscillation thereof; and a resolver coupled to said transducer for continuously indicating the position thereof during said mechanical oscillation.

2. An ultrasonic transducer scanning apparatus for scanning a body under test to determine a selected characteristic thereof, said apparatus comprising:

an oscillatory mass including a transducer for receiving ultrasonic energy;

a utilization circuit responsive to the ultrasonic energy received by said transducer to relate the received energy to the time domain;

a torsion spring having one end coupled to a reference plane and the other end coupled to said oscillatory mass to provide said oscillatory mass with a natural frequency of oscillation; and means coupled to said oscillatory mass for supplying the energy lost by the oscillatory mass during mechanical oscillation thereof.

3. An ultrasonic transducer scanning apparatus as in claim 2 wherein a resolver is coupled to said oscillatory mass for indicating the position of said transducer during the mechanical oscillation of said oscillatory mass.

4. In an ultrasonic scanning apparatus adapted for movement in a fluid along a selected path to scan a body under test for determining a selected characteristic thereof:

an oscillatory mass being supported by a chassis therefor and including a transducer for sending ultrasonic energy to said body and receiving back reflections therefrom;

a signal source connected for energizing said transducer and causing it to send said ultrasonic energy;

a utilization circuit responsive to the reflections from said body received by said transducer to relate said reflections to the time domain;

a torsion spring having one end attached to said rotating mass;

means mounted on said chassis and coupled to the other end of said torsion spring for supplying the energy lost by said oscillatory mass during mechanical oscillation thereof; and a resolver coupled to said oscillatory mass for continuously indicating the position of said transducer during the mechanical oscillation thereof.

5. An ultrasonic transducer scanning apparatus for scanning a body under test to determine a selected characteristic thereof, said apparatus comprising:

an oscillatory mass including a transducer for receiving ultrasonic energy;

a utilization circuit responsive to the ultrasonic energy received by said transducer to relate the received energy to the time domain;

a torsion spring having one end attached to said oscillatory mass; and means mounted on a reference plane and coupled to the other end of said torsion spring for supplying the energy lost by said oscillatory mass during mechanical oscillation thereof.

6. An ultrasonic transducer scanning apparatus as in claim 5 wherein a resolver is coupled to said oscillatory mass for continuously indicating the position of said transducer during the mechanical oscillation of said oscillatory mass.

7. A transducer scanning apparatus for scanning a body under test to determine a selected characteristic thereof, said apparatus comprising:

a torsion spring and an oscillatory mass operatively connected to provide a system having a natural frequency of oscillation;

said oscillatory mass including a transducer for receiving energy;

a utilization circuit responsive to the energy received by said transducer;

means coupled to said system for supplying the energy lost by said oscillatory mass during mechanical oscillation thereof; and a resolver connected to said oscillatory mass for indicating the position of said transducer during the mechanical oscillation thereof.

8. A transducer scanning apparatus for scanning a body under test to determine a selected characteristic thereof, said apparatus comprising:

a torsion spring and an oscillatory mass operatively connected to provide a system having a natural frequency of oscillation;

said oscillatory mass including a transducer for sending energy;

a signal source connected for energizing said transducer to send energy to said body;

means coupled to said system for supplying the energy lost by said oscillatory mass during mechanical oscillation thereof; and a resolver connected to said oscillatory mass for indicating the position of said transducer during the mechanical oscillation thereof.

9. An ultrasonic transducer scanning apparatus for scanning a body under test to determine a selected characteristic thereof, said apparatus comprising:

an oscillatory mass including a transducer for sending ultrasonic energy;

a signal source connected to said transducer for energizing it to send ultrasonic energy to said body;

a torsion spring having one end coupled to a reference plane and the other end coupled to said oscillatory mass to provide said oscillatory mass with a natural frequency of oscillation; and means coupled to said oscillatory mass for supplying the energy lost by said oscillatory mass during mechanical oscillation thereof.

10. An ultrasonic transducer scanning apparatus as in claim 9 wherein a resolver is coupled to said oscillatory mass for indicating the position of said transducer during the mechanical oscillation of said oscillatory mass.

11. An ultrasonic transducer scanning apparatus for scanning a body under test to determine a selected characteristic thereof, said apparatus comprising:

an oscillatory mass including a transducer for sending ultrasonic energy;

a signal source connected to said transducer for energizing it to send ultrasonic energy to said body;

a torsion spring having one end attached to said oscillatory mass; and means mounted on a reference plane and coupled to the other end of said torsion spring for supplying the energy lost by said oscillatory mass during mechanical oscillation thereof.

12. An ultrasonic transducer scanning apparatus as in claim 11 wherein a resolver is coupled to said oscillatory mass for continuously indicating the position of said transducer during the mechanical oscillation of said oscillatory mass.

References Cited

UNITED STATES PATENTS 3,086,390   4/1963   Brown               73—67.8
3,308,652   3/1967   Appel et al.        73—71.5

RICHARD C. QUEISSER, *Primary Examiner.*

JOHN P. BEAUCHAMP, *Assistant Examiner.*